United States Patent [19]

Mickelson

[11] 4,220,557
[45] Sep. 2, 1980

[54] FLUORINE-PROMOTED SULFACTIVE METAL HYDROGENATION CATALYSTS

[75] Inventor: Grant A. Mickelson, Yorba Linda, Calif.

[73] Assignee: Union Oil Company of California, Los Angeles, Calif.

[21] Appl. No.: 963,573

[22] Filed: Nov. 24, 1978

[51] Int. Cl.$^2$ .................. B01J 27/12; B01J 23/28; B01J 23/30; C10G 23/02
[52] U.S. Cl. ..................... 252/441; 252/442
[58] Field of Search ................ 251/441, 442

[56] References Cited

U.S. PATENT DOCUMENTS

| | | | |
|---|---|---|---|
| 2,760,907 | 8/1956 | Attane, Jr. et al. | 252/441 |
| 3,857,780 | 12/1974 | Gustafson | 208/138 |
| 4,152,251 | 5/1979 | Mickelson | 208/254 H |

FOREIGN PATENT DOCUMENTS 769217  3/1957  United Kingdom ............... 252/442

*Primary Examiner*—P. E. Konopka
*Attorney, Agent, or Firm*—Gregory F. Wirzbicki; Dean Sandford

[57] ABSTRACT

Highly active, acidic sulfactive metal hydrogenation catalysts comprising Mo and/or W plus Ni and/or Co are prepared by methods comprising as the essential novel feature impregnating gamma alumina particles with an aqueous solution having dissolved therein one or more fluosilicates of cobalt and/or nickel, followed by drying and calcining. The resulting compositions contain uniformly distributed fluorine and $SiO_2$ as active acidic promoters, intimately associated with the sulfactive metal components.

10 Claims, No Drawings

FLUORINE-PROMOTED SULFACTIVE METAL HYDROGENATION CATALYSTS

BACKGROUND AND SUMMARY OF INVENTION

Bifunctional alumina-based catalysts comprising a sulfactive metal hydrogenation component and an acidic promotor such as silica, halogen, phosphate, etc. are well known in the art. The sulfactive metal hydrogenation component comprises Mo and/or W plus Co and/or Ni, in sulfided form and is active primarily for the selective hydrogenation and cracking of organic sulfur and nitrogen compounds in hydrocarbon feedstocks, with minimum hydrocracking of hydrocarbons. With no added acidic component, such catalysts are very useful for the hydrodesulfurization of mineral oils and fractions thereof. However, it has been known for some time that the activity of such catalysts for denitrogenation of such feedstocks, or for the selective hydrocracking of high-boiling hydrocarbons, can be much improved by incorporating therein one or more of the above-noted acidic components, fluorine being the most active.

The manufacture of such fluorine-promoted catalysts has in the past entailed considerable expense, attributable to the difficulty involved in incorporating all of the active components uniformly into the alumina support without bringing about a drastic reduction in surface area of the final composite. The most economical method for the manufacture of multi-component, alumina-supported catalysts consists in comulling alumina hydrogel with soluble or insoluble precursors of the active components, then extruding, drying and calcining the composite. The alumina gel used in this method (usually predominantly boehmite) is highly reactive until a stage in the calcination step is reached at which it is converted to gamma alumina, which is much less reactive. When acidic fluorine compounds are present during the mulling, drying and initial stages of calcination, extensive reaction with the alumina gel takes place, with resultant marked reduction in surface area of the calcined composite. It is hence necessary to add the fluorine component after conversion of the alumina support to suitably porous, high-surface-area aggregates of gamma alumina, and this entails impregnation with aqueous solutions.

Salts of nickel and cobalt also tend to react with alumina hydrogen during mulling, drying and calcination to form relatively inactive crystalline aluminates, and hence it is also desirable to employ aqueous impregnation techniques for adding those metals. By observing proper control of calcination temperatures (to avoid loss in surface area) molybdenum or tungsten compounds can be comulled with the alumina hydrogel, extruded and calcined to provide a suitable base for subsequent impregnation with the fluorine, cobalt and nickel components, but in general highest activity is obtained by properly controlled impregnation of all components on the preformed gamma alumina support.

When resorting to impregnation with a plurality of active components, a primary objective is to reduce the number of impregnations to a minimum—one if possible—since each imgregnation and calcination involves substantial time and expense. However the preparation of stable impregnation solutions containing the necessary concentrations of fluorine compound and metal compounds to give the desired proportion of each component, evenly distributed throughout the pores of the alumina support from a single impregnation step, has not in the past been achieved. Commonly, at least two, and often three separate impregnations, with intervening calcinations have been utilized, as disclosed for example in U.S. Pat. No. 2,760,907. Insofar as I am aware a separate impregnation with the fluorine component, e.g. HF or $H_2SiF_6$, has always been considered a practical necessity in order to insure homogeneous impregnation and prevent precipitation of one or more of the metal components in the outer rind of the support particles, the fluorides of Ni and Co being only slightly soluble in water.

I have now discovered that the fluosilicate salts of cobalt or nickel can be very advantageously employed in aqueous impregnation solutions as combined sources of active fluorine, cobalt and/or nickel in the finished catalysts. These fluosilicates, $NiSiF_6 \cdot 6H_2O$ and $CoSiF_6 \cdot 6H_2O$, are very soluble in water, relatively non-corrosive, not highly acidic, and form stable solutions which do not form precipitates upon contact with the gamma alumina support. Moreover, upon calcination an additional acid-forming component is generated, $SiO_2$, which also may improve thermal stability of the catalyst.

According to one modification of the invention a soluble Mo and/or W compound can also be included in the fluosilicate impregnation solution, e.g., ammonium metatungstate or ammonium heptamolybdate. It is preferred however that the Mo/W component be added to the support prior to impregnation with the fluosilicate solution, as by pre-impregnation of the calcined $Al_2O_3$, or by comulling suitable Mo/W compounds with the alumina hydrogel prior to extrusion and calcination. In the latter procedure only a single impregnation is required to produce the finished catalyst, but somewhat higher activity generally results from the former procedure which requires two impregnations. According to another non-preferred technique, the Mo/W component can be impregnated into the catalyst after impregnation with the fluosilicate solution.

DETAILED DESCRIPTION

The finally calcined catalysts of this invention are designed to fall within the following composition ranges:

| Catalyst Composition, Wt. % | | |
|---|---|---|
| Component | Broad Range | Preferred Range |
| CoO and/or NiO | 1–15 | 2–8 |
| $MoO_3$ and/or $WO_3$ | 5–35 | 8–25 |
| F | 0.5–10 | 1–7 |
| $SiO_2$ | 1–10 | 2–5 |
| $Al_2O_3$ | Balance | |
| Wt. Ratio, (CoO + NiO)/($MoO_3$ + $WO_3$) | 0.1–1.0 | 0.12–0.5 |

In the succeeding description, it will be understood that the proportions of the various raw materials utilized will be selected to provide finished catalysts falling within the above composition ranges. Also, in order to avoid repetition of the cumbersome "CoO and/or NiO" and "$MoO_3$ and/or $WO_3$" terminology, the description will be confined to the preferred nickel-molybdenum type catalysts, but it will be understood that corresponding cobalt components can be substituted in whole or in part for any of the described nickel components, and corresponding tungsten components in whole or in part for any of the described molybdenum components.

In the preferred method for manufacturing catalysts of this invention, an alumina hydrogel is first shaped, as by conventional extrusion techniques, into particles of the desired size and shape, e.g. extrudates having a diameter between about 1/32" and ¼", preferably about 1/20"-⅛". The extrudates are then dried and calcined at e.g. 800°–1400° F. to convert the extrudates into porous gamma alumina having a surface area of about 150–350 m²/g and a pore volume of about 0.3–1.2 ml/g, as determined by mercury porosimeter measurements at 50,000 psi.

The calcined extrudates are then impregnated with an aqueous solution of a suitable molybdenum compound which upon calcination yields $MoO_3$, the preferred compound being ammonium heptamolybdate. In this impregnation, as well as all impregnation steps described herein, the "pore saturation" technique is preferably utilized, in which the volume of impregnation solution utilized is only sufficient to substantially saturate, i.e. fill, the pores of the support particles. This is preferably accomplished by spraying the solution at a controlled rate onto the agitated particles, or a stream of such particles moving for example on a conveyor belt. The volume of solution employed is at least about 90% of the pore volume of the particles to be impregnated, but not substantially in excess of 100% of such pore volume. There should be substantially no drainable excess of liquid. By operating in this manner, maximum uniformity of distribution of active components is obtained, as well as maximum control over proportions of active components absorbed or adsorbed by the support particles. When using older impregnation techniques involving soaking the particles in an excess of solution, differential ionic adsorption rates and destabilization of the solution with resultant formation of precipitates frequently lead to maldistribution of active components on the support, and control over the amounts of active components adsorbed is more difficult. These considerations are particularly important when the impregnating solution contains ions of more than one active component, as e.g. those containing nickel fluosilicate to be subsequently described herein.

It will be appreciated also that in the pore saturation technique it is important that highly soluble compounds of the active components be utilized in order to provide, in a poresaturating volume of the solution, sufficient dissolved precursors of active component(s) to provide the predetermined desired amount of such active component(s) in the finished catalyst, thereby avoiding the necessity for multiple impregnations and calcinations. The preferred Ni, F and Mo compounds employed herein are all highly soluble, as distinguished for example from $NiF_2$ which is only slightly soluble in water and which would hence not be suitable for single-step impregnation by the pore saturation technique.

Following impregnation with the desired molybdenum component, the wet particles are dried and calcined in conventional fashion in air at temperatures ranging between about 700° and 1400° F. This calcination is believed to result in substantial chemical combination of the molybdenum with the alumina gel to form aluminum molybdate, $(AlO)_2MoO_4 \cdot xH_2O$. The calcined particles are then impregnated with sufficient of a concentrated aqueous solution of nickel fluosilicate to saturate the pore volume of the particles and provide the predetermined desired amounts of Ni and F in the finished catalyst.

In the case of essentially non-volatile acitve components such as Ni and Mo, it is a simple matter to predetermine the concentration of soluble precursors thereof needed in a pore-saturating volume of solution to provide the desired active metal content in the finished catalyst. However, in all known impregnation methods for adding fluorine to alumina-based catalysts, some volatilization and loss of fluorine during drying and calcination occurs. The amount of such loss depends upon several variables such as the initial F concentration, calcination temperatures, hydrolytic reactions occurring while steam is present, and the presence of absence in the catalyst of other acidic components which can chemically compete with HF for the reactive alumina base. A certain amount of experimentation is therefore required in any given method for the manufacture of F-containing catalysts by impregnation, in order to achieve a desired target F content in the finished catalyst.

This problem is considerably alleviated when using nickel fluosilicate as a fluorine source, because the weight-ratio of F/Ni in $NiSiF_6 \cdot 6H_2O$ is about 1.95/1, which is normally higher than will be desired in the finished catalyst. Hence, in many case, even though some 20–40% of the F is lost by volatilization, the residual F/Ni ratio after calcination will be satisfactory. However, in cases where adjustment of the F/Ni ratio in the final catalyst is desired, such may readily be achieved by adding to the nickel fluosilicate impregnation solution additional Ni in the form of a soluble salt such as the nitrate or acetate, or additional F in the form of HF, $NH_4F$ or the like. In all cases however, the major portion of the Ni and F components in the final catalyst, and usually all of at least one of said components, is derived from the nickel fluosilicate.

Following impregnation with the nickel fluosilicate solution, the catalyst is again dried and calcined as above described to complete the preferred method of manufacture. The finished catalyst should have a surface area between about 100–300 m²/g and a porosity of about 0.2–1.0 ml/g.

According to a non-preferred modification of the foregoing procedure, the molybdenum component, e.g. ammonium heptamolybdate or $MoO_3$, can be mulled with the alumina hydrogel, and the mixture then extruded, calcined and impregnated with the nickel fluosilicate solution. This procedure has the advantage of eliminating one impregnation-calcination sequence, but generally yields catalysts of somewhat lesser activity and mechanical strength.

In still another modification the calcined alumina extrudates can be impregnated with a single solution containing all three active components, i.e. ammonium heptamolybdate and nickel fluosilicate. However, in this case it is necessary to add an acid to the solution, preferably phosphoric acid, in order to stabilize the solution against precipitation. In general sufficient acid should be added to reduce the pH of the solution to about 0.5–3.0. After calcination the catalysts produced by this method are substantially as active as those prepared by the preferred method, at equivalent F, Ni and Mo contents. Due to the presence of phosphate however, there is a greater tendency to lose fluorine during calcination and during use of the catalyst in denitrogenation. Surface areas are also somewhat lower.

The least preferred catalyst preparation method embraced herein consists in first impregnating the calcined alumina extrudates with the nickel fluosilicate solution, calcining, then impregnating with the molybdate solution and again calcining. This method generally results in catalysts of relatively low activity and low fluorine content. They are however definitely more active than corresponding non-fluorided catalysts.

Use of Catalysts

The catalysts of this invention can be used to advantage for the hydrodenitrogenation of substantially any mineral oil feedstock, including light and heavy gas oils, cycle oils, naphthas, kerosene, turbine fuels, diesel fuels, reduced crude oils, residual oils, shale oils and other syncrudes, etc. The denitrogenation conditions are conventional, falling within the following ranges:

| Denitrogenation Conditions | | |
|---|---|---|
| | Broad Range | Preferred Range |
| Temp., °F. | 450–900 | 550–800 |
| $H_2$ Pressure, psi | 200–3000 | 500–2000 |
| LHSV | 0.2–10 | 1–5 |
| $H_2$/oil, SCF/B | 200–8000 | 500–4000 |

Prior to contact with the feedstock, the catalyst should be presulfided with $H_2S$ or an $H_2S$-yielding compound under conventional conditions including temperatures ranging between about 100°–900° F.

The following non-limiting examples are illustrative of the invention:

EXAMPLE 1—PREPARATION OF CATALYST A

In this and the succeeding examples, the support employed was a 1200°–1250° F. calcined gamma alumina extrudate having a surface area of 254 $m^2/g$ and a pore volume of about 0.64 ml/g. The extrudates had a "trilobal" or three-leaf clover type of cross-section as illustrated in FIG. 5-A of U.S. Pat. No. 3,857,780, the "diameter" across two lobes of the cross-section being about 0.045 in.

A first impregnation solution was prepared by dissolving 160 gms of ammonium heptamolybdate in 250 ml of water. Additional water and concentrated $NH_4OH$ was added to give 375 ml of solution having a pH of 9.0. This solution was rapidly added to 500 gms of the alumina extrudates which were then shaken thoroughly to effect pore saturation. The wet extrudates were dried and calcined by heating to 600° C. over a three-hour period and holding at 600° C. for 15 minutes. After cooling, the extrudates were then pore-saturated in the same manner as above with 350 ml of an aqueous solution containing 111.3 gms of dissolved $NiSiF_6 \cdot 6H_2O$. After aging for about one hour the extrudates were dried and calcined by heating to 500° C. over a two-hour period and holding at 500° C. for one hour. The properties of the finished catalyst are tabulated in Table 1 below.

EXAMPLE 2—PREPARATION OF CATALYST B

A single-impregnation solution was prepared by first partially dissolving 165 gms of ammonium heptamolybdate in 200 ml of distilled water and then adding 56 gms of 85% orthophosphoric acid to obtain a clear water-white solution. Next, 111.3 gms of $NiSiF_6 \cdot 6H_2O$ was dissolved in 150 ml of distilled water and heated to 60° C. The two solutions were then mixed to obtain about 450 ml of slightly hazy solution having a pH of about 1.7–2.0. This solution was then employed to pore saturate 500 gms of the alumina extrudates as above described, with vigorous agitation. A small amount of excess liquid was drained from the extrudates. After aging for 45 minutes, the extrudates were then dried and calcined by heating to 500° C. over a period of 2 hours and holding at 500° C. for 1 hour. Properties of the finished catalyst are given below in Table 1.

EXAMPLE 3—PREPARATION OF CATALYST C

This catalyst was prepared in the same manner and using the same constituents as used for catalyst A, except that the alumina extrudates were first impregnated with the $NiSiF_6 \cdot 6H_2O$ solution, calcined at 500° C., then impregnated with the ammonium heptamolybdate solution, and recalcined at 500° C. Properties of the respective catalysts were as follows:

Table 1

| | Catalyst | | |
|---|---|---|---|
| | A | B | C |
| $MoO_3$, wt. % | 20.1 | 17.7 | 19.2 |
| NiO, wt. % | 4.29 | 3.47 | 4.00 |
| F, wt. % | 5.2 | 3.3 | 3.19 |
| $SiO_2$, wt. % | 3.6 | 2.6 | 3.06 |
| P, wt. % | — | 2.34 | — |
| Surface Area, $m^2/g$ | 184 | 162 | 195 |
| Pore Vol., ml/g | 0.42 | 0.41 | 0.45 |

EXAMPLES 4–7, ACTIVITY TESTING

Each of the foregoing catalysts was tested for denitrogenation activity, along with a commercial fluorine-free comparison catalyst prepared from the same alumina support material and containing 18 wt. % $MoO_3$, about 3 wt. % NiO and 3 wt. % P (added as phosphoric acid with the molybdenum component). The nickel was added by impregnation with $Ni(NO_3)_2$ solution. The test feed was a light diesel fuel boiling between about 400° and 650° F., containing 0.65 wt. % sulfur and 0.038 wt. % total nitrogen. The tests were carried out at 700° F. and 700 psig, with a $H_2$ recycle rate of 3000 SCF/B of feed. Each catalyst was tested at 5.0 LHSV and 2.5 LHSV, and the product nitrogen values were plotted against reciprocal space velocity so that relative activities based on the first order kinetics could be determined at equal conversion levels. At 97.5% conversion of total nitrogen (10 ppm product nitrogen), the relative activities of the catalysts were as follows:

Table 2

| | Catalyst | | | |
|---|---|---|---|---|
| | Comparison | A | B | C |
| Relative Activity | 100 | 179 | 156 | 120 |

It is thus apparent that nickel fluosilicate provides effective fluorine-promotion of the catalysts. Although some F and Ni were lost from catalyst B due to a slight excess of unabsorbed impregnating solution and to fluorine volatilization, it is apparent in view of its high activity that appropriate adjustment of its F and Ni contents would give an activity comparable to that of catalyst A.

The following claims and their obvious equivalents are believed to define the true scope of the invention.

I claim:

1. In the manufacture of an acidic, sulfactive hydrogenation catalyst wherein a first component of molybdenum and/or tungsten, a second component of nickel and/or cobalt, and a fluorine component are intimately composited with an alumina support, the improved method for incorporating said second component and said fluorine component into said catalyst in a single impregnation step, which comprises:

(1) forming porous cohesive aggregates comprising said alumina support in the form of calcined gamma alumina;

(2) compositing essentially all of said fluorine and said second component with said aggregates by impregnation, said impregnation consisting essentially of contacting said aggregates with an aqueous impregnation solution having dissolved therein one or more fluosilicate salts of cobalt and/or nickel, said solution containing fluorine essentially completely in the form of fluosilicate and containing essentially no fluorine in any other dissolved form, and said impregnation being carried out with an amount of impregnation solution sufficient to fill at least about 90% of the pore volume of said aggregates, but not substantially in excess of the amount required for 100% saturation thereof; and (3) drying and calcining the impregnated aggregates from step (2)

2. A method as defined in claim 1 wherein said aggregates from step (1) also comprise said first component intimately composited therein in calcined form.

3. A method as defined in claim 1 wherein said first component is incorporated into said catalyst by including in said impregnation solution in step (2) a soluble form of said first component.

4. A method as defined in claim 1 wherein said first component is incorporated into said catalyst by impregnation following step (3).

5. A method as defined in claim 1 wherein said first component is molybdenum and said second component is nickel.

6. In the manufacture of an acidic, sulfactive hydrogenation catalyst wherein a first component of molybdenum and/or tungsten, a second component of nickel and/or cobalt, and a fluorine component are intimately composited with an alumina support, the improved method for incorporating said second component and said fluorine component into said catalyst in a single impregnation step, which comprises:

(1) forming porous cohesive aggregates comprising said alumina support in the form of calcined gamma alumina;

(2) forming an aqueous impregnation solution having dissolved therein a sufficient concentration of soluble precursors of said fluorine component and said second component to provide, in a volume of said solution substantially equal to the total pore volume of said aggregates to be impregnated, the total amount of said fluorine component and said second component desired in the finished catalyst, at least the major atomic portions of Co and Ni and essentially all of the F in said solution being in the form of cobalt and/or nickel fluosilicate;

(3) uniformly applying to said aggregates an amount of said impregnation solution sufficient to saturate at least about 90% of the pore volume of said aggregates, but not substantially in excess of the amount required for 100% saturation thereof; and (4) drying and calcining the aggregates from step (3).

7. A method as defined in claim 6 wherein said aggregates from step (1) also comprise said first component intimately composited therein in calcined form.

8. A method as defined in claim 6 wherein said first component is incorporated into said catalyst by including in said impregnation solution in step (2) a soluble form of said first component.

9. A method as defined in claim 6 wherein said first component is incorporated into said catalyst by impregnation following step (4).

10. A method as defined in claim 6 wherein said first component is molybdenum and said second component is nickel.

* * * * *